(12) United States Patent
Lyons (10) Patent No.: US 9,522,501 B2
(45) Date of Patent: Dec. 20, 2016

(54) CONTINUOUS LINEAR PRODUCTION IN A SELECTIVE LASER SINTERING SYSTEM

(75) Inventor: Brett Ian Lyons, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 1329 days.

(21) Appl. No.: 12/886,631

(22) Filed: Sep. 21, 2010

(65) Prior Publication Data
US 2012/0067501 A1    Mar. 22, 2012

(51) Int. Cl.
*B29C 67/00*    (2006.01)

(52) U.S. Cl.
CPC ....... *B29C 67/0092* (2013.01); *B29C 67/0077* (2013.01)

(58) Field of Classification Search
CPC ............. B29C 67/0051; B29C 67/0074; B29C 67/0077; B29C 67/0085; B29C 67/0088; B29C 67/0092
USPC ............. 156/64; 264/401; 700/118, 119, 120
See application file for complete search history.

(56) References Cited

U.S. PATENT DOCUMENTS

| | | | |
|---|---|---|---|
| 4,575,330 A * | 3/1986 | Hull | 425/174.4 |
| 4,938,816 A | 7/1990 | Beaman et al. | |
| 6,652,256 B2 * | 11/2003 | Coe | 425/130 |
| 8,046,097 B2 | 10/2011 | Hull et al. | |
| 2007/0164485 A1 * | 7/2007 | Hwang et al. | 264/401 |
| 2009/0072447 A1 | 3/2009 | Hull et al. | |

FOREIGN PATENT DOCUMENTS

| | | |
|---|---|---|
| DE | 19507881 A1 | 9/1995 |
| WO | WO2012039843 A1 | 3/2012 |

OTHER PUBLICATIONS

PCT search report dated Feb. 1, 2012 regarding PCT/US2011/046744, 2 Pages.
State Intellectual Property Office of PRC Notification of Second Office Action and English translation, dated May 13, 2015, regarding Application No. 201180045403.2, 20 pages.

* cited by examiner

*Primary Examiner* — George Koch
(74) *Attorney, Agent, or Firm* — Yee & Associates, P.C.

(57) ABSTRACT

A method and apparatus for forming objects. Layers of precursor material may be placed on top of each other. The layers of precursor material may be selectively cured as the layers of precursor material are placed on top of each other to form an object and a frame associated with the object.

12 Claims, 9 Drawing Sheets

CONTINUOUS LINEAR PRODUCTION IN A SELECTIVE LASER SINTERING SYSTEM

BACKGROUND INFORMATION

1. Field

The present disclosure relates generally to manufacturing objects and, in particular, to a method and apparatus for manufacturing objects using additive manufacturing. Still more particularly, the present disclosure relates to a method and apparatus for manufacturing objects using selective laser sintering.

2. Background

Manufacturing of objects may be performed in a number of different ways. For example, objects, such as aircraft parts, may be manufactured using additive manufacturing. Additive manufacturing may be a process of joining materials to make objects. These objects may be made by using models of the desired object.

Additive manufacturing may be performed using various technologies. For example, without limitation, an aerosol jetting system may send a stream of particles towards a substrate. The particles on the substrate may be heated to a temperature to cause the particles to adhere to each other.

As another example, electron beams may be used to melt a metal powder layer in a desired pattern. Additional layers may be placed and melted on the layers to form the object.

With selective laser sintering, a laser system may direct a laser beam to selectively heat portions of the layer of powder to form a portion of the object. Additional layers of powder may be placed on the prior layers and heated to form the object.

Although additive manufacturing may provide for rapid production of parts, this type of manufacturing may not be suitable for all types of parts. For example, without limitation, additive manufacturing my often be used to generate prototypes of parts. Additionally, additive manufacturing may be limited by the cost of systems used to make parts. Further, additive manufacturing may also be limited in terms of the types of parts made based on an ability of the different systems to make particular parts.

As a result, the expense and time savings provided by additive manufacturing may not be realized as often as desired. When additive manufacturing cannot be used, more traditional manufacturing systems, such as the use of molds to form parts or dyes for use with presses, may be employed. These types of systems, however, may have undesired lead times to form the molds and dies, as well as the expense of specialized equipment to manufacture the parts.

Therefore, it would be advantageous to have a method and apparatus that takes into account one or more of the issues discussed above, as well as other possible issues.

SUMMARY

In one advantageous embodiment, a method may be present for forming objects. Layers of precursor material may be placed on top of each other. The layers of precursor material may be selectively cured as the layers of precursor material are placed on top of each other to form an object and a frame associated with the object.

In another advantageous embodiment, a method may be present for forming aircraft parts. Layers of precursor material may be placed on a base structure for a frame. The layers of precursor material may be selected from one of a powder, a liquid, a metal powder, a ceramic powder, and a plastic powder. The layers of precursor material may be selectively cured using a curing system after placing the layers of precursor material on the base structure to form a portion of an aircraft part and a portion of the frame to form a prior layer of precursor material. The curing system may be selected from one of a heating system, a laser, and an electron beam. The frame may be moved to allow a new layer of precursor material to be placed on the prior layer of precursor material in the layers of precursor material that may have been selectively cured. The new layer of precursor material may be placed on the prior layer of precursor material. A determination may be made as to whether a new base structure in the frame is needed. The new layer of precursor material may be selectively cured to form an additional portion of the aircraft part and a portion of the new base structure in response to the determination that the new base structure is needed. In response to the determination that the new base structure is needed, the steps of moving the frame to allow the new layer of precursor material to be placed on the prior layer of precursor material in the layers of precursor material that has been selectively cured, placing the new layer of precursor material on the prior layer of precursor material, and selectively curing the new layer of precursor material to form a portion of the object and the portion of the new base structure may be repeated until the base structure is completed. In response to an absence of the determination that the new base structure is needed, the new layer of precursor material may be selectively cured to form the additional portion of the aircraft part without forming the new base structure. In response to the absence of the determination that the new base structure is needed, the steps of moving the frame to allow the new layer of precursor material to be placed on the prior layer of precursor material in the layers of precursor material that has been selectively cured, placing the new layer of precursor material on the prior layer of precursor material, and selectively curing the new layer of precursor material to form the portion of the object without the new base structure may be repeated until the new base structure is needed. A desired temperature for the portion of the aircraft part may be maintained in different locations in the chamber as the aircraft part is formed using a plurality of heating and cooling elements. The uncured precursor material may be cooled to change a density of the uncured precursor material such that a flow of gas through the precursor material is reduced. Each portion of the aircraft part may be separated from an associated base structure connected to each portion of the aircraft part using a separation system.

In yet another advantageous embodiment, an apparatus may comprise a chamber, a curing system, and a movement system. The curing system may be configured to cure portions of layers of precursor material deposited in the chamber to form an object and a frame connected to the object. The movement system may be configured to engage the frame and move the frame and the object connected to the frame as a new layer of precursor material is placed on a prior layer of precursor material.

In a further advantageous embodiment, a laser sintering apparatus may comprise a chamber, a curing system, a movement system, a precursor deposition system, a temperature control system, a separation system, and a recycling system. The curing system may be configured to cure portions of layers of precursor material deposited in the chamber to form an aircraft part and a frame connected to the aircraft part. The frame may comprise a plurality of base structures and a plurality of connectors and may be configured to support the aircraft part during formation of the aircraft part in the chamber. The curing system may be selected from at least one of a heating system, a laser, and an electron beam. The movement system may be configured to engage the frame and move the frame connected to the aircraft part as a new layer of precursor material may be placed on a prior layer of precursor material. The movement system may comprise a plurality of gears having first teeth configured to engage second teeth formed on sides of the plurality of base structures. The precursor deposition system may be configured to deposit the new layer of precursor material on the prior layer of precursor material. The temperature control system may be configured to control a temperature of at least one of the aircraft part and the frame. The temperature control system may comprise a plurality of heating and cooling elements configured to heat and cool walls of a chamber to control the temperature of at least one of the aircraft part and the frame and in which the temperature control system may be configured to cool uncured precursor material that has been deposited to change a density of the uncured precursor material such a flow of gas through the precursor material is reduced. The separation system may be configured to separate the aircraft part from a base structure. The separation system may be configured to separate the aircraft part from the base structure as the base structure and the aircraft part are moved by the movement system. The recycling system may be configured to recycle portions of the layers of precursor material that remain uncured. The layers of precursor material may be selected from one of a powder, a liquid, a metal powder, and a ceramic powder.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
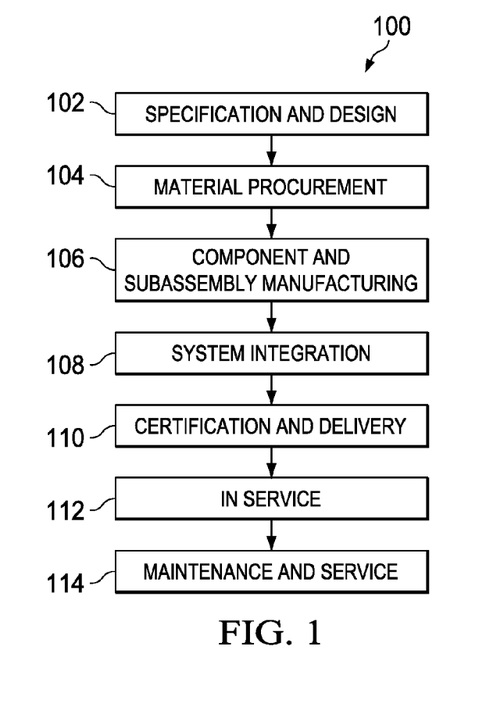
FIG. 1 is an illustration of an aircraft manufacturing and service method in accordance with an advantageous embodiment.
Figure 2:
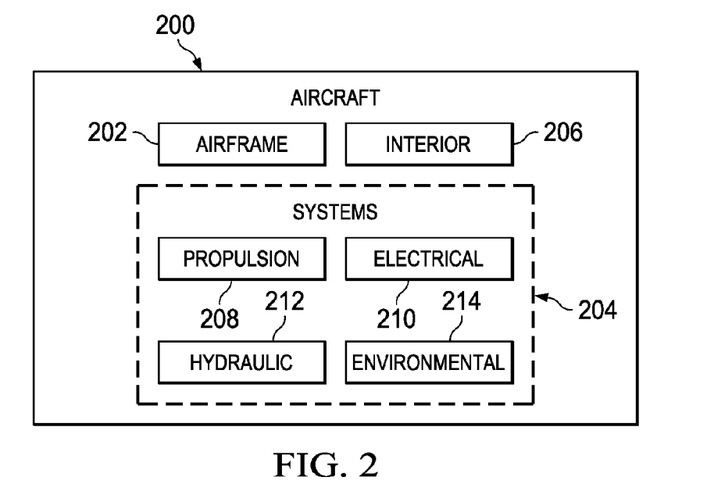
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. In particular, the different advantageous embodiments may be used to manufacture parts during one or more of these stages. The use of a number of the different advantageous embodiments may substantially expedite the assembly of and/or reduce the cost of aircraft 200.

The different advantageous embodiments recognize and take into account a number of considerations. For example, without limitation, the different advantageous embodiments recognize and take into account that current selective laser sintering machines may be capable of building parts of various shapes, sizes, and/or configurations. The dimensions of these parts may, however, be limited based on the size and shape of the chamber. For example, without limitation, the size of the part may be confined in two axes based on the walls of the chamber in which the selective laser sintering is performed. Another axis may be based on the movement of the platform with respect to the walls.

The different advantageous embodiments recognize and take into account that the size of the part may be increased by scaling the size of the chambers. However, this type of manufacturing may be limited based on the cost and space needed for larger chambers. The different advantageous embodiments recognize and take into account that it would be advantageous to have a capability to manufacture larger parts without needing to have larger chambers to hold the parts as the parts are formed.

For example, without limitation, the different advantageous embodiments recognize and take into account that some components may have lengths of about 20 feet or more. More specifically, a duct in a section of a fuselage may have a length of about 20 to about 40 feet. This length may be based on a length of a portion of a fuselage made out of a composite material. The different advantageous embodiments recognize and take into account that it would be desirable to make a duct that has the length of the section of a fuselage instead of joining pieces to each other to form the duct in the fuselage. The different advantageous embodiments recognize and take into account that by making the duct in a single piece for a section of a fuselage, the amount of time and expense needed to install a duct in a portion of a fuselage may be decreased.

For example, without limitation, the different advantageous embodiments recognize and take into account that current ducts for environmental control systems in fuselages may be formed by different cross-sections that may be bonded or fastened to each other. This type of assembly may require lead time, costs, and may have design limitations. Further, additional labor may be needed to assemble the parts.

Thus, the different advantageous embodiments provide a method and apparatus for manufacturing objects. The different advantageous embodiments may place layers of precursor material on top of each other. The layers of precursor material may be selectively cured as they are placed on top of each other to form a portion of an object and a portion of a frame associated with the object.

Figure 3:
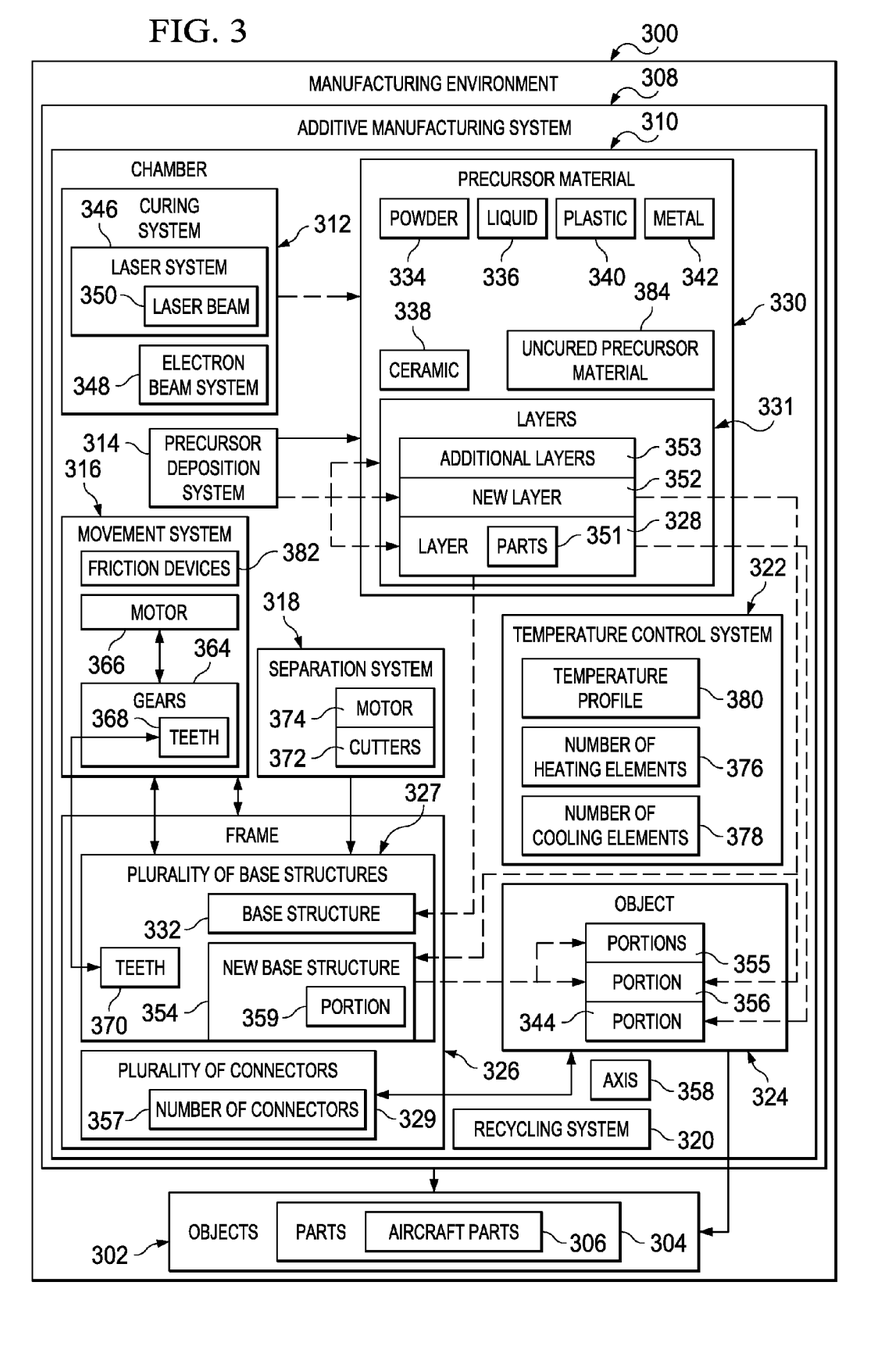
FIG. 3 is an illustration of a manufacturing environment in accordance with an advantageous embodiment.

With reference now to FIG. 3, an illustration of a manufacturing environment is depicted in accordance with an advantageous embodiment. In these illustrative examples, manufacturing environment 300 may be used to manufacture objects. In these illustrative examples, objects 302 may take the form of parts 304. Parts 304 may be aircraft parts 306 for use in aircraft 200 in FIG. 2. These parts may be manufactured during various phases of aircraft manufacturing and service method 100 in FIG. 1.

In these illustrative examples, objects 302 may be manufactured using additive manufacturing system 308. As depicted, additive manufacturing system 308 may comprise chamber 310, curing system 312, precursor deposition system 314, movement system 316, separation system 318, recycling system 320, and temperature control system 322.

Chamber 310 may be associated with curing system 312, precursor deposition system 314, movement system 316, separation system 318, and recycling system 320. In these examples, object 324 may be formed inside chamber 310.

Object 324 may be formed and supported using frame 326. Frame 326 may be associated with object 324. A first component may considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

In these examples, frame 326 may be directly connected to object 324. Frame 326 may be formed as object 324 is formed within additive manufacturing system 308. As depicted, frame 326 may be comprised of plurality of base structures 327 and plurality of connectors 329. Plurality of connectors 329 may be used to connect plurality of base structures 327 to each other and/or to object 324. Base structures within plurality of base structures 327 and connectors within plurality of connectors 329 may be added to frame 326 as object 324 is formed. In this manner, frame 326 may grow as object 324 grows within additive manufacturing system 308.

Object 324 may be formed by processing layers 331 of precursor material 330. Precursor material 330 may take a number of different forms. For example, without limitation, precursor material 330 may be selected from one of powder 334, liquid 336, and other suitable forms of precursors. In these illustrative examples, precursor material 330 may be described in the form of powder 334. Additionally, precursor material 330 may be made from a number of different types of materials. For example, without limitation, precursor material 330 may be in the form of at least one of ceramic 338, plastic 340, metal 342, and other suitable types of materials.

In these illustrative examples, layers 331 of precursor material 330 may be placed on top of each other. Layers 331 of precursor material 330 may be selectively cured using curing system 312 as layers 331 of precursor material 330 are placed on top of each other to form object 324 and frame 326.

For example, without limitation, precursor deposition system 314 may place layer 328 of precursor material 330 onto base structure 332 in plurality of base structures 327. Depending on the type of precursor material 330 used, layer 328 may cover all of base structure 332. For example, without limitation, when precursor material 330 takes the form of powder 334, layer 328 may cover all of base structure 332. When precursor material 330 takes the form of liquid 336, layer 328 may be placed onto base structure 332 in a pattern for object 324 such that portions of base structure 332 may not be covered by liquid 336. As stated above, these illustrative examples are described with precursor material 330 taking the form of powder 334.

In these illustrative examples, base structure 332 may be formed prior to any curing being performed by curing system 312. For example, without limitation, base structure 332 may be a first base structure in plurality of base structures 327 for frame 326. Base structure 332 may be a solid structure having a capability to support formation of object 324 within additive manufacturing system 308.

Layer 328 of precursor material 330 may be selectively cured using curing system 312 to form portion 344 of object 324. Curing system 312 may take a number of different forms. For example, without limitation, curing system 312 may include at least one of laser system 346, electron beam system 348, and other suitable types of curing systems.

In these illustrative examples, when curing system 312 takes the form of laser system 346, laser beam 350 may be selectively applied to parts 351 of layer 328 of precursor material 330 to selectively cure parts 351 of layer 328 to form portion 344 of object 324. Further, curing parts 351 of layer 328 may also connect portion 344 of object 324 to base structure 332.

After layer 328 of precursor material 330 has been selectively cured to form portion 344 of object 324, base structure 332 for frame 326 with portion 344 of object 324 may be moved by movement system 316 in a direction away from curing system 312.

Thereafter, precursor deposition system 314 may place new layer 352 of precursor material 330 on the prior layer of precursor material, layer 328. A determination is made as to whether a new base structure is needed for frame 326 to support object 324. In response to a determination that a new base structure is needed, curing system 312 selectively cures new layer 352 of precursor material 330 to form portion 359 of new base structure 354 and portion 356 of object 324. Further, additional layers 353 of precursor material 330 may be placed onto frame 326 and cured to form portions 355 of object 324 and complete the formation of new base structure 354.

In these illustrative examples, at least one of portion 356 and portions 355 of object 324 may be associated with new base structure 354. In other words, at least one of portion 356 and portions 355 may be connected to new base structure 354. This connection may be made in a manner that provides additional support for object 324 within curing system 312. For example, without limitation, this connection may be made by curing at least one of new layer 352 and additional layers 353 such that number of connectors 357 in plurality of connectors 329 is formed. Number of connectors 357 may connect at least one of portion 356 and portions 355 of object 324 with new base structure 354.

If new base structure 354 is not needed, then new layer 352 is selectively cured using curing system 312 to form portion 356 of object 324 in new layer 352 without forming new base structure 354.

Each time a layer in layers 331 is selectively cured, frame 326 may be moved away from curing system 312 in a direction along axis 358. Axis 358 may extend through chamber 310. The movement of base structure 332 away from curing system 312 along axis 358 may occur after selectively curing a prior layer of precursor material 330. Base structure 332 may be moved away from curing system 312 along axis 358 prior to placing new layer 352 of precursor material 330 in these examples.

These steps can be repeated until object 324 may be completed. In other words, the steps of moving base structure 332 away from curing system 312, placing new layer 352 on a prior layer of precursor material, and selectively curing new layer 352 may be repeated to complete forming object 324. In forming object 324, base structure 332, new base structure 354, and any other base structures that may be formed become part of frame 326.

In these illustrative examples, movement system 316 may be configured to engage and move frame 326 through moving plurality of base structures 327. In these illustrative examples, movement system 316 may comprise, without limitation, gears 364, which may be turned by motor 366. Gears 364 may have teeth 368. Teeth 368 may engage teeth 370 formed in plurality of base structures 327.

When object 324 is complete or partially complete, separation system 318 may separate plurality of base structures 327 from object 324. In these illustrative examples, separation system 318 may include cutters 372, which may be rotated by motor 374. Cutters 372 may engage plurality of base structures 327 in a manner that separates plurality of base structures 327 from object 324.

Cutters 372 may include, for example, without limitation, lasers, jets filled with abrasive media, blades, and/or other suitable types of devices. Plurality of base structures 327 and precursor material 330 may be recycled by recycling system 320. Some or all of precursor material 330 that has not been selectively cured may be returned to precursor deposition system 314 for use in manufacturing additional objects.

In these depicted examples, frame 326 may be considered as a chamber within chamber 310 that can be formed and taken apart as object 324 and/or other objects are being formed. In this manner, with the use of frame 326, a larger chamber than chamber 310 may be unnecessary.

In these illustrative examples, temperature control system 322 may comprise at least one of number of heating elements 376 and number of cooling elements 378 located in different locations in association with chamber 310. Temperature control system 322 may maintain temperature profile 380 for object 324 along axis 358. Temperature profile 380 may be a gradient of temperatures along frame 326. Temperature profile 380 may control the expansion or contraction of plurality of base structures 327 and object 324 during or after curing by curing system 312.

Further, in these depicted examples, number of heating elements 376 and number of cooling elements 378 may be used to cool uncured precursor material 384 to increase the density of uncured precursor material 384. In these examples, this increase in the density of uncured precursor material may cause uncured precursor material 384 to not move in an undesired manner through chamber 310 and/or out of chamber 310. In other words, uncured precursor material 384 may stick together when the density of uncured precursor material 384 is increased.

Additionally, plurality of base structures 327 and precursor material 330 that is cured may be cooled during this process in addition to uncured precursor material 384. This cooling may increase the density of precursor material 330 such that a flow of gas through precursor material 330 may be reduced. The gas may be, for example, without limitation, oxygen. This reduction in the flow of oxygen through precursor material 330 may reduce decreases in the mechanical performance of object 324 caused by the flow of gas through precursor material 330.

For example, as plurality of base structures 327 cools, plurality of base structures 327 may shrink in size. The shrinking in size may prevent teeth 370 from engaging teeth 368. Temperature control system 322 may maintain a temperature that is configured to allow teeth 368 to continue to engage teeth 370 throughout chamber 310.

Additionally, in some illustrative examples, gears 364 may be selectively repositioned to take into account a change in size in plurality of base structures 327. Additionally, chamber 310 may be tapered along axis 358 to take into account reduction in the size of plurality of base structures 327 from cooling.

In these illustrative examples, recycling system 320 may collect base structures within plurality of base structures 327 and/or precursor material 330 to be recycled. For example, without limitation, precursor material 330 left over after formation of object 324 may be collected and reused by precursor deposition system 314 for the formation of other objects. Further, base structure 332 may be reused for the formation of other objects.

In manufacturing object 324, other objects may be manufactured prior to object 324 being completely separated from plurality of base structures 327. In this manner, continuous manufacturing of objects 302 may occur within additive manufacturing system 308. Additionally, one of plurality of base structures 327 may serve as base structure 332 for a new object rather than having to place a new first base structure within chamber 310 and engaging the base structure with movement system 316.

The illustration of manufacturing environment 300 in FIG. 3 is not meant to imply physical or architectural limitations to a manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional additive manufacturing systems, in addition to additive manufacturing system 308, may be present in manufacturing environment 300. In still other advantageous embodiments, objects 302 may take forms other than parts 304 or aircraft parts 306. For example, without limitation, objects 302 may take the form of automobile parts, ship parts, pipes, tubing, tools, furniture, and/or other suitable types of objects.

Further, in other illustrative examples, movement system 316 may comprise devices in addition to or in place of gears 364. For example, without limitation, movement system 316 may comprise friction devices 382. Friction devices 382 may include any device configured to create friction between friction devices 382 and frame 326. This friction is used to move frame 326. For example, without limitation, friction devices 382 may include wheels, tracks, and/or other suitable types of devices.

Figure 4:
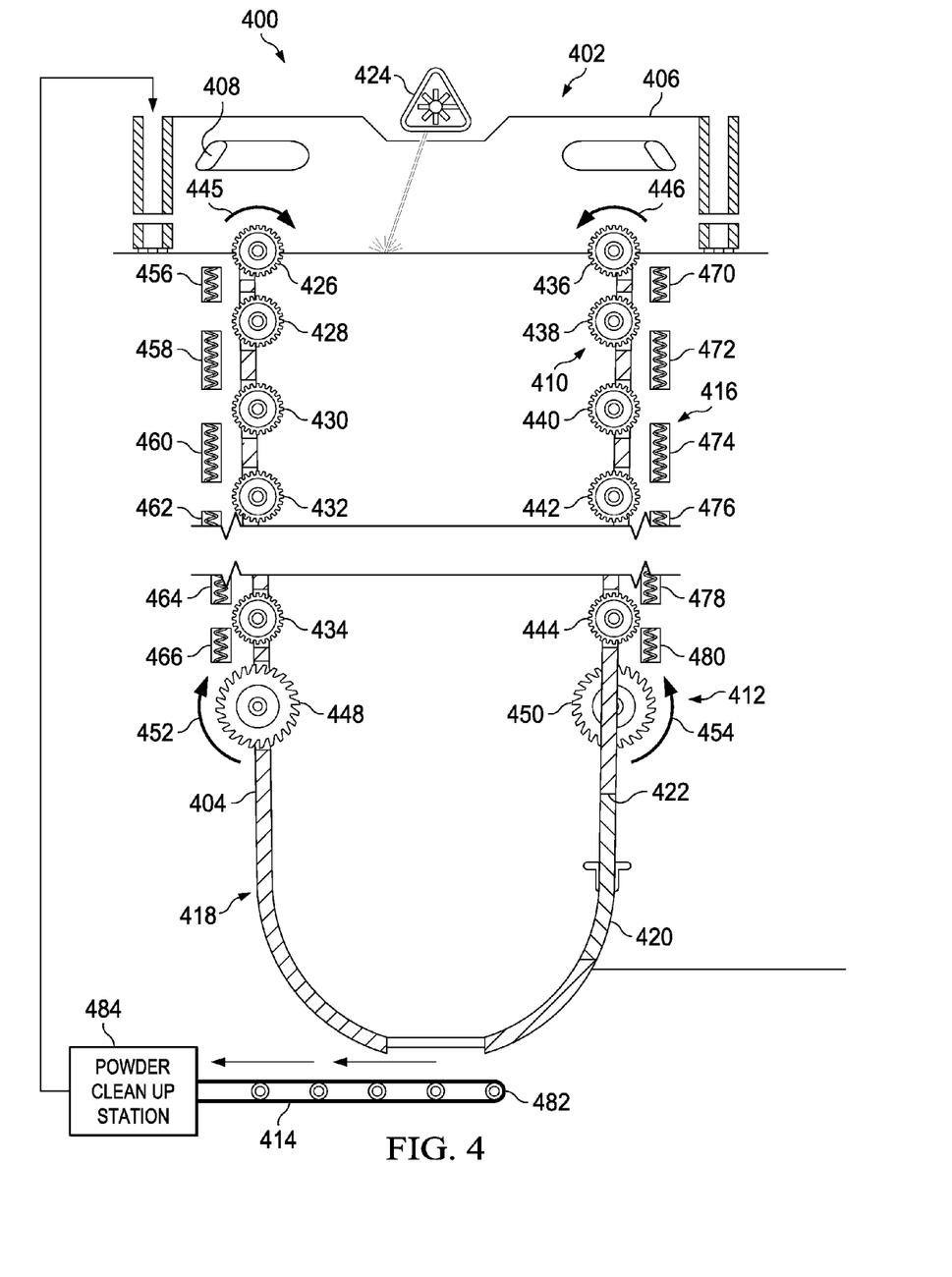
FIG. 4 is an illustration of a manufacturing environment in accordance with an advantageous embodiment.

With reference now to FIG. 4, an illustration of a manufacturing environment is depicted in accordance with an advantageous embodiment. Manufacturing environment 400 is an example of one implementation of manufacturing environment 300 in FIG. 3. In this illustrative example, additive manufacturing system 402 provides an example of one manner in which additive manufacturing system 308 in FIG. 3 may be implemented.

As depicted, additive manufacturing system 402 may comprise chamber 404, curing system 406, precursor deposition system 408, movement system 410, separation system 412, recycling system 414, and temperature control system 416.

In these illustrative examples, chamber 404 may comprise walls 418 and door 420. Door 420 closes opening 422 in walls 418 of chamber 404. Curing system 406 may comprise laser system 424 in these examples.

As illustrated, movement system 410 may include gears 426, 428, 430, 432, 434, 436, 438, 440, 442, and 444. In these examples, gears 426, 428, 430, 432, and 434 may turn in the direction of arrow 445. Gears 436, 438, 440, 442, and 444 may turn in the direction of arrow 446.

Separation system 412 may comprise cutter 448 and cutter 450. Cutter 448 may turn in the direction of arrow 452, while cutter 450 may turn in the direction of arrow 454.

Temperature control system 416 may include elements 456, 458, 460, 462, 464, 466, 470, 472, 474, 476, 478, and 480. These elements may be selected from at least one of heating elements, cooling elements, and other suitable types of elements. As illustrated, recycling system 414 may comprise conveyor belt 482 and powder cleanup station 484. Powder cleanup station 484 may return any reusable precursor material to precursor deposition system 408.

Figure 5:
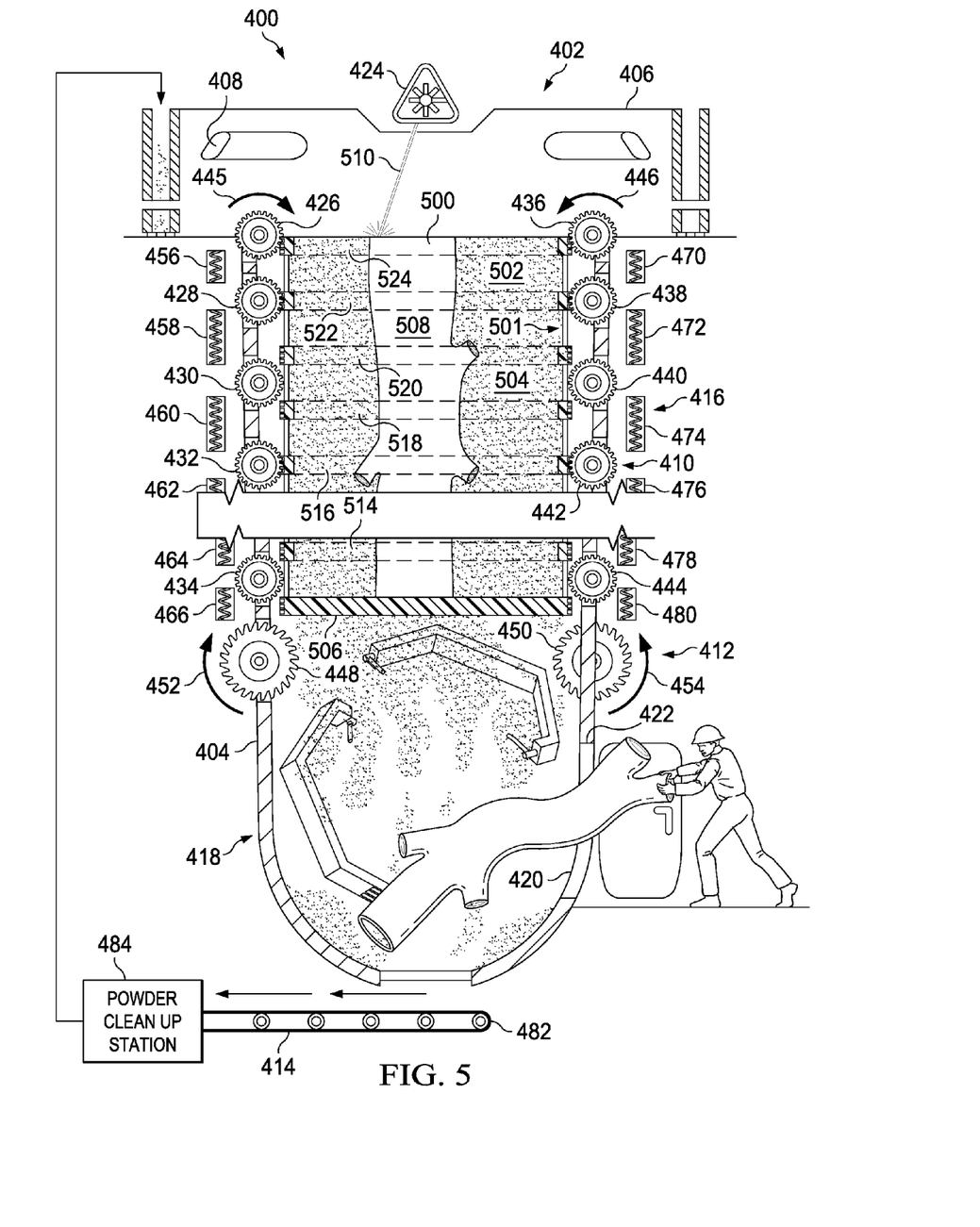
FIG. 5 is an illustration of manufacturing objects in an additive manufacturing system in accordance with an advantageous embodiment.

With reference now to FIG. 5, an illustration of manufacturing objects in an additive manufacturing system is depicted in accordance with an advantageous embodiment. In this illustrative example, object 500 may be manufactured through the placement of precursor material 502 in layers 504 onto base structure 506. Portions 508 of object 500 may be formed as layers 504 of precursor material 502 are placed onto base structure 506 with laser system 424 applying laser beam 510 to selectively cure precursor material 502.

In this illustrative example, frame 501 may support object 500 as object 500 is formed. Frame 501 may comprise base structures 506, 514, 516, 518, 520, 522, and 524. As depicted, a cross-sectional view of frame 501 may be illustrated in this illustrative example. Further, base structures 514, 516, 518, 520, 522, and 524 may be seen in phantom view.

Figure 6:
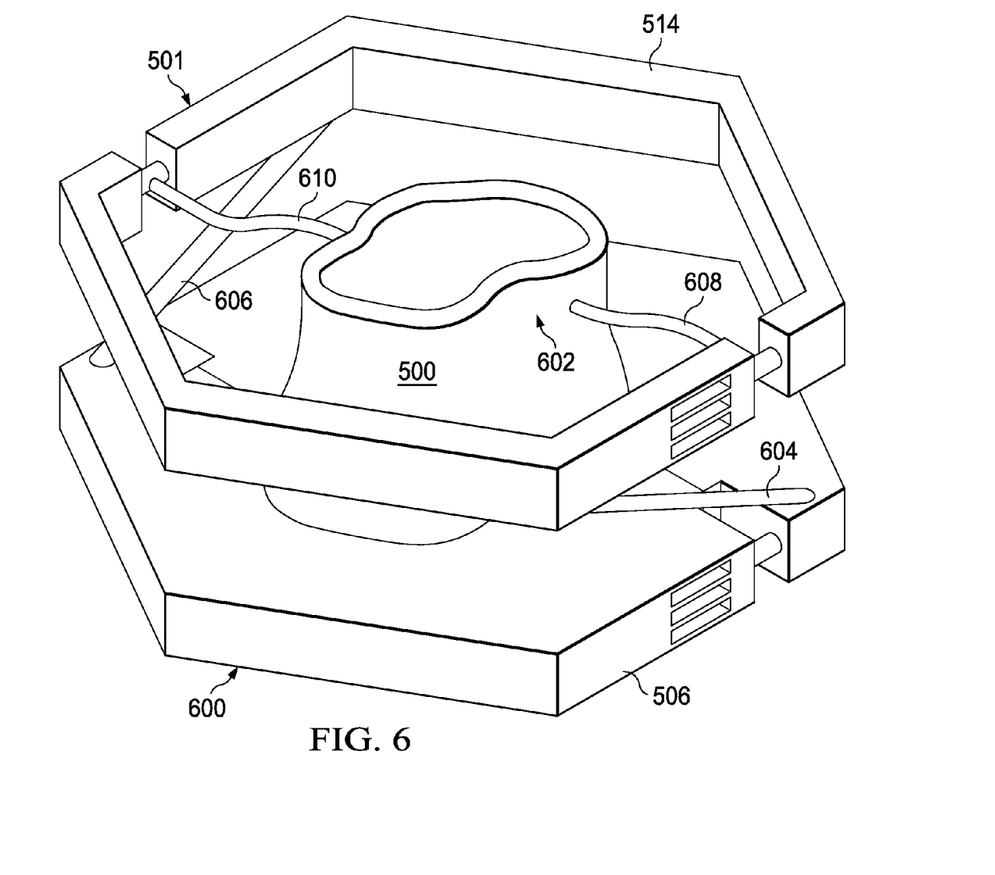
FIG. 6 is an illustration of a portion of a frame connected to a portion of an object in accordance with an advantageous embodiment.

With reference now to FIG. 6, an illustration of a portion of a frame connected to a portion of an object is depicted in accordance with an advantageous embodiment. In this illustrative example, portion 600 of frame 501 may be connected to portion 602 of object 500 in FIG. 5.

As depicted, base structure 506 may be connected to base structure 514 by connector 604 and connector 606. Further, base structure 514 may be connected to portion 602 of object 500 by connector 608 and connector 610. In this manner, portion 602 of object 500 may be supported by base structure 506 and base structure 514.

Figure 7:
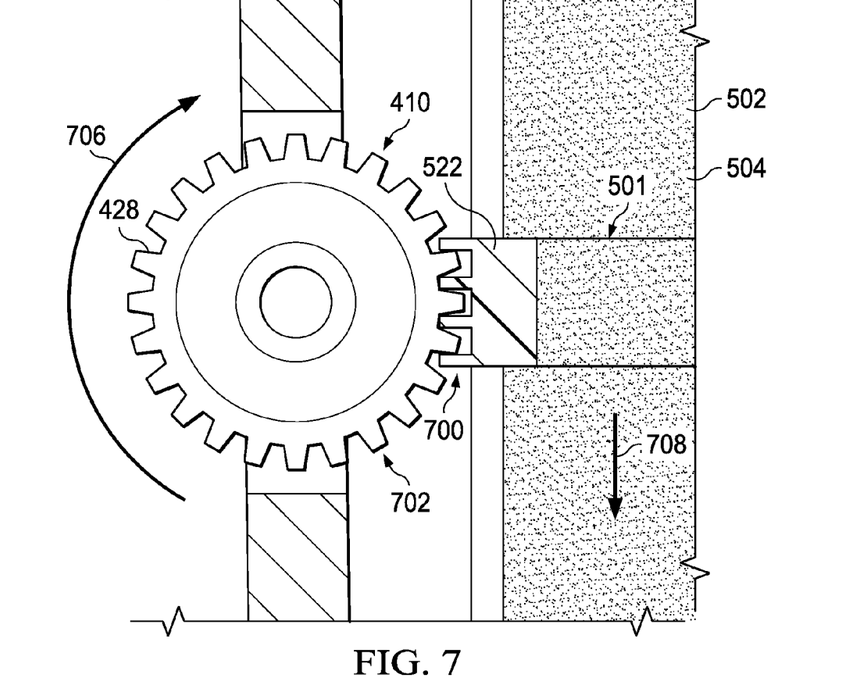
FIG. 7 is an illustration of a portion of a movement system engaging a base structure for a frame in accordance with an advantageous embodiment.

With reference now to FIG. 7, an illustration of a portion of a movement system engaging a base structure for a frame is depicted in accordance with an advantageous embodiment. In this illustrative example, gear 428 of movement system 410 may be seen engaging base structure 522 of frame 501.

As depicted, gear 428 may have teeth 702. Base structure 522 may have teeth 700. Gear 428 may be rotated in the direction of arrow 706, such that teeth 702 may engage teeth 700 on base structure 522. This rotation of gear 428 may cause base structure 522 and frame 501 to be moved along axis 708.

Figure 8:
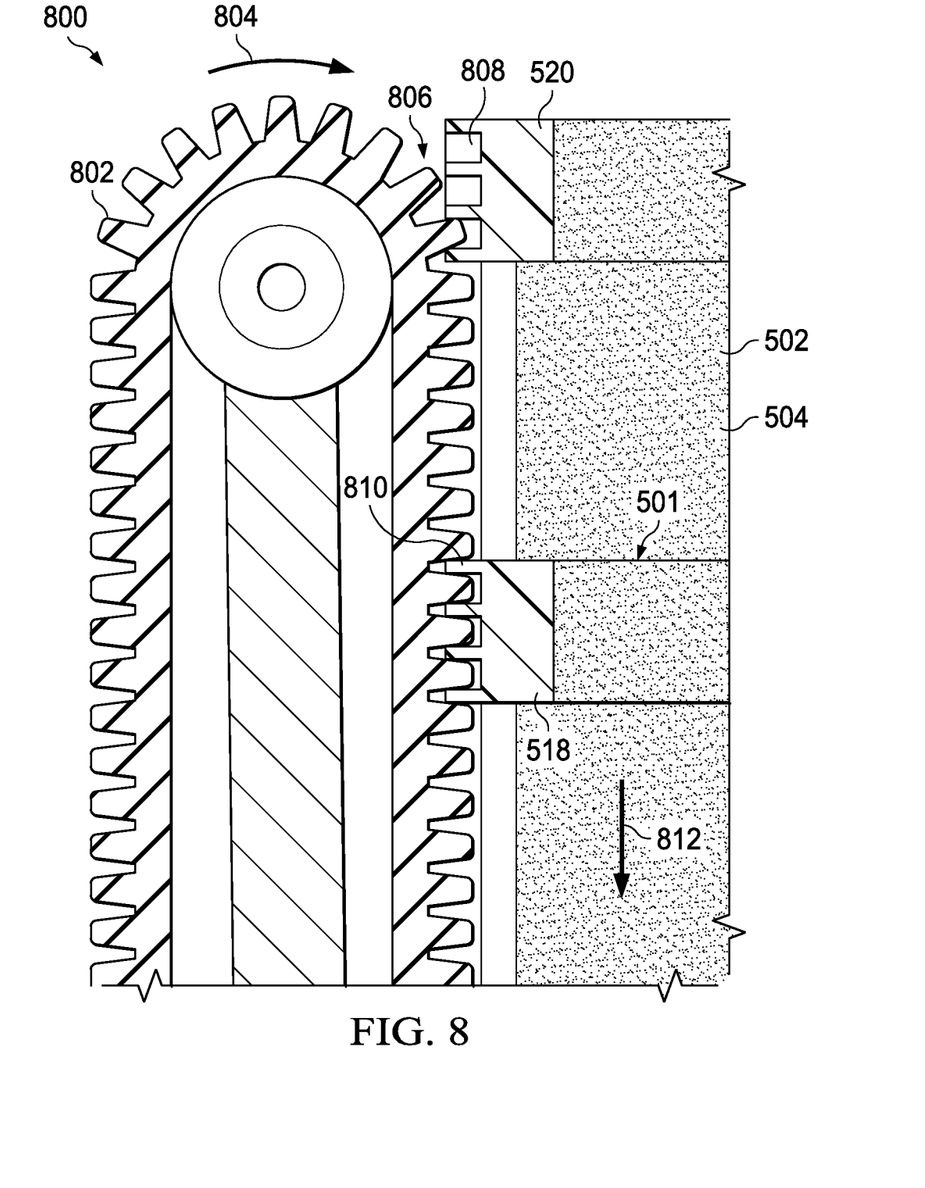
FIG. 8 is an illustration of a portion of a movement system engaging a portion of a frame in accordance with an advantageous embodiment.

With reference now to FIG. 8, an illustration of a portion of a movement system engaging a portion of a frame is depicted in accordance with an advantageous embodiment.

In this illustrative example, movement system 800 may be used to engage frame 501 in FIG. 5 in the place of movement system 410 in FIG. 4.

As depicted, movement system 800 may have track 802. Track 802 may have teeth 806 around track 802. Teeth 806 may be configured to engage teeth 808 on base structure 520, teeth 810 on base structure 518, and other teeth (not shown in this view) on other base structures (not shown in this view) for frame 501.

In this illustrative example, track 802 may be moved such that teeth 806 move in the direction of arrow 804. This movement of track 802 and teeth 806 may cause frame 501 with base structure 518 and base structure 520 to be moved in a direction along axis 812.

Figure 9:
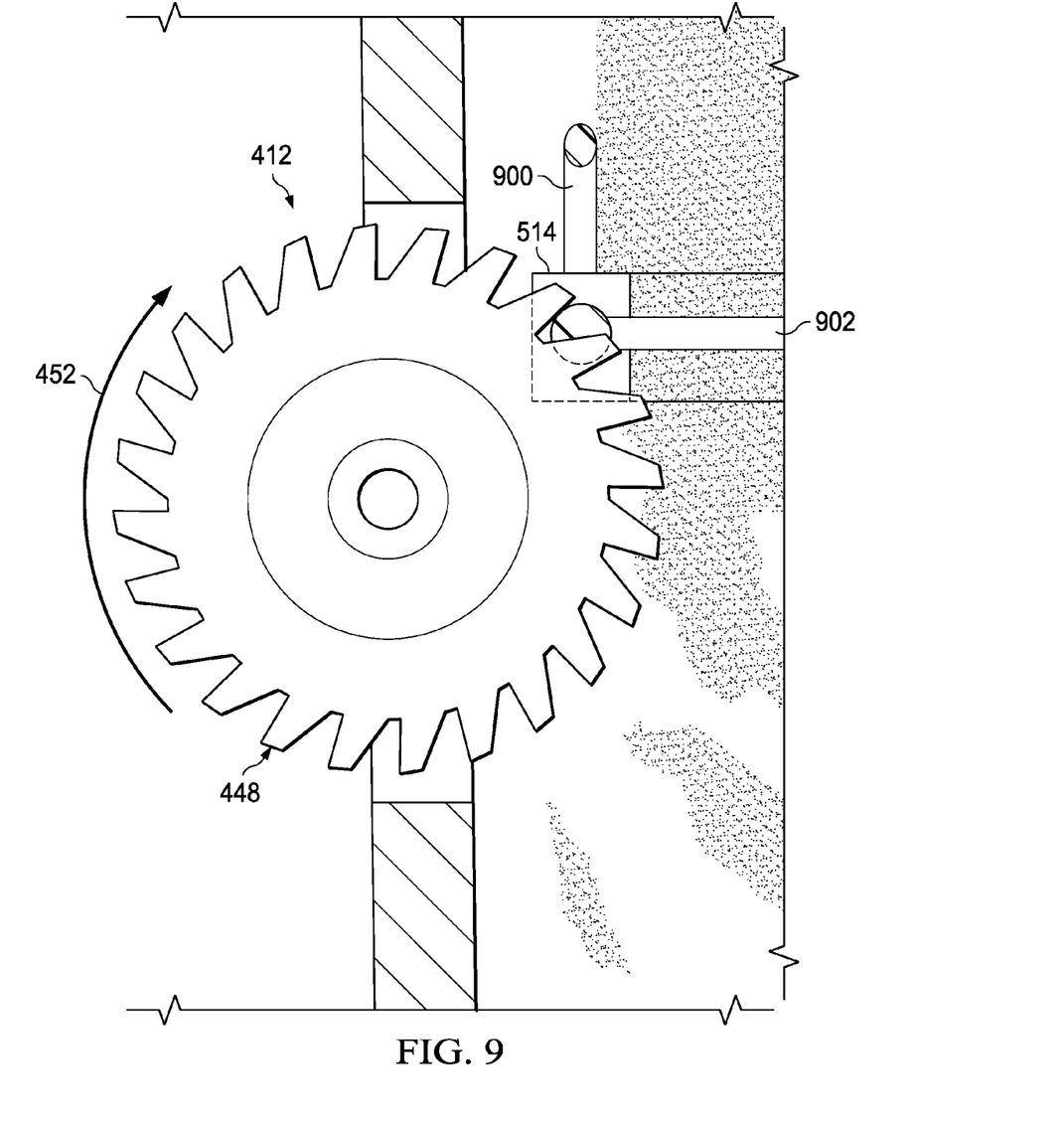
FIG. 9 is an illustration of a cutter for a separation system in accordance with an advantageous embodiment.

With reference now to FIG. 9, an illustration of a cutter for a separation system is depicted in accordance with an advantageous embodiment. In this illustrative example, cutter 448 for separation system 412 may rotate in the direction of arrow 452 to separate base structure 514 from object 500 in FIG. 5.

As depicted, base structure 514 may be connected to connector 900 and connector 902. Connector 900 may have connected base structure 514 to base structure 516 in FIG. 5. Connector 902 may have connected base structure 514 to object 500 in FIG. 5.

Figure 10:
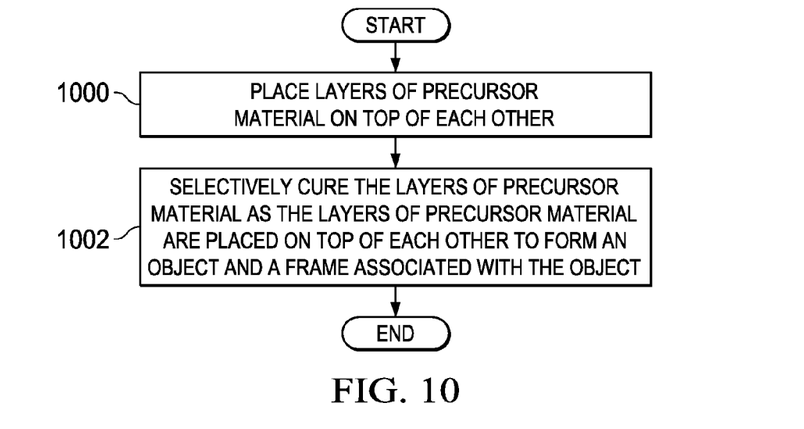
FIG. 10 is an illustration of a flowchart of a process for manufacturing objects in accordance with an advantageous embodiment.

With reference now to FIG. 10, an illustration of a flowchart of a process for manufacturing objects is depicted in accordance with an advantageous embodiment. In this illustrative example, the process may be implemented using additive manufacturing system 308 in manufacturing environment 300 in FIG. 3.

The process may begin by placing layers 331 of precursor material 330 on top of each other (operation 1000). The process may selectively cure layers 331 of precursor material 330 as layers 331 of precursor material 330 are placed on top of each other to form object 324 and frame 326 associated with object 324 (operation 1002), with the process terminating thereafter.

Figure 11:
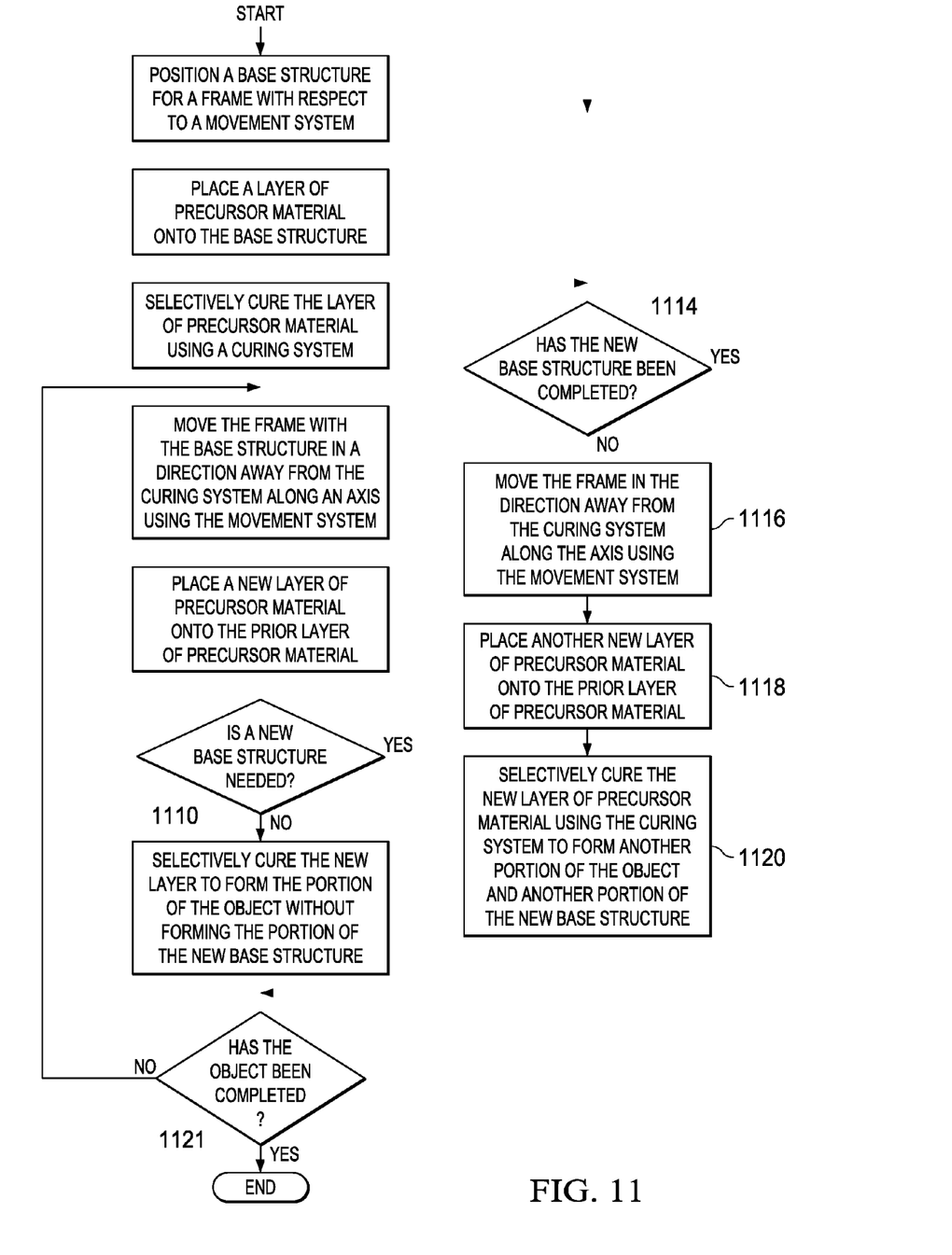
FIG. 11 is an illustration of a flowchart of a process for manufacturing an object in accordance with an advantageous embodiment.

With reference now to FIG. 11, an illustration of a flowchart of a process for manufacturing an object is depicted in accordance with an advantageous embodiment. The process illustrated in FIG. 11 may be implemented using additive manufacturing system 308 in manufacturing environment 300 in FIG. 3.

The process may begin by positioning base structure 332 for frame 326 with respect to movement system 316 (operation 1100). In operation 1100, the process may position base structure 332 such that movement system 316 may hold and/or move base structure 332 and frame 326 as frame 326 grows.

Thereafter, layer 328 of precursor material 330 may be placed onto base structure 332 (operation 1102). Next, layer 328 of precursor material 330 may be selectively cured using curing system 312 (operation 1104).

Frame 326 with base structure 332 may be moved in a direction away from curing system 312 along axis 358 using movement system 316 (operation 1106). The layer of precursor material that has been selectively cured may be referred to as a prior layer in these examples.

Thereafter, the process may place new layer 352 of precursor material 330 onto the prior layer of precursor material 330 (operation 1108). A determination may be made as to whether a new base structure is needed (operation 1110). In response to a determination that a new base structure is needed, new layer 352 of precursor material 330 may be selectively cured to form portion 356 of object 324 and portion 359 of new base structure 354 (operation 1112).

A determination may be made as to whether new base structure 354 has been completed (operation 1114). If new base structure 354 has not been completed, frame 326 may be moved in a direction away from curing system 312 along axis 358 using movement system 316 (operation 1116). Thereafter, another new layer of precursor material 330 may be placed onto the prior layer of precursor material 330 (operation 1118). In operation 1118, the prior layer of precursor material 330 is new layer 352 that was selectively cured in operation 1112. The new layer of precursor material 330, in operation 1118, is a different layer from new layer 352 in operation 1112.

Next, the new layer may be selectively cured using curing system 312 to form another portion of object 324 and another portion of new base structure 354 (operation 1120). Thereafter, the process may return to operation 1114 as described above.

With reference again to operation 1114, if new base structure 354 has been completed, a determination may be made as to whether object 324 has been completed (operation 1121). If object 324 has been completed, the process may then terminate. Otherwise, if object 324 has not been completed, the process may return to operation 1106 as described above. With reference again to operation 1110, if a new base structure is not needed, new layer 352 may be selectively cured by curing system 312 to form portion 356 of object 324 without forming portion 359 of new base structure 354 (operation 1122). Thereafter, the process may proceed to operation 1121 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for manufacturing objects. The different advantageous embodiments may place layers of precursor material on top of each other. The layers of precursor material may be selectively cured as they are placed on top of each other to form a portion of an object and a portion of a frame associated with the object.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming objects, the method comprising:
   placing layers of precursor material on top of each other;

selectively curing the layers of precursor material as the layers of precursor material are placed on the top of each other to form an object and a frame associated with the object, the frame comprising a plurality of base structures, wherein selectively curing the layers comprises:
  determining whether a new base structure in the frame is needed;
  responsive to a determination that the new base structure is needed, selectively curing the new layer of precursor material to form a portion of the object and a portion of the new base structure; and
  responsive to an absence of the determination that the new base structure is needed, selectively curing the new layer of precursor material to form the portion of the object without forming the portion of the new base structure;
moving the frame to allow a new layer of precursor material to be placed on a prior layer of precursor material in the layers of precursor material that have been selectively cured; and
placing the new layer of precursor material on the prior layer of precursor material.

2. The method of claim 1, wherein selectively curing the layers further comprises:
  responsive to the determination that the new base structure is needed, repeating the steps of:
  moving the frame to allow a new layer of precursor material to be placed on the prior layer of precursor material in the layers of precursor material that has been selectively cured;
  placing the new layer of precursor material on the prior layer of precursor material; and
  selectively curing the new layer of precursor material to form a portion of the object and a portion of the new base structure until the new base structure is completed.

3. The method of claim 1 further comprising:
  responsive to the absence of the determination that the new base structure is needed, repeating the steps of:
  moving the frame to allow the new layer of precursor material to be placed on the prior layer of precursor material in the layers of precursor material that have been selectively cured;
  placing the new layer of precursor material on the prior layer of precursor material; and
  selectively curing the new layer of precursor material to form a portion of the object without the new base structure until the new base structure is needed.

4. The method of claim 1, wherein the step of responsive to the determination that the new base structure is needed further comprises:
  responsive to the determination that the new base structure is needed, selectively curing the new layer of precursor material to form the portion of the object and the portion of the new base structure.

5. The method of claim 4 further comprising:
  separating using cutters, each portion of the object from an associated base structure connected to the each portion of the object.

6. The method of claim 1 further comprising:
  forming a base structure; and
  placing the base structure in a movement system prior to placing the layers of precursor material on the base structure.

7. The method of claim 1 further comprising:
  maintaining a desired temperature for the object as the object is formed in a chamber.

8. The method of claim 7, wherein the step of maintaining the desired temperature for the object as the object is formed in the chamber further comprises:
  maintaining the desired temperature for the object in different locations as the object is formed in the chamber using a plurality of heating and cooling elements.

9. The method of claim 1 further comprising:
  cooling uncured precursor material to change a density of the uncured precursor material such that a flow of gas through the precursor material is reduced.

10. The method of claim 1, wherein a movement system holds and moves the frame along an axis.

11. The method of claim 5, wherein a separation system comprising cutters, separates the each portion of the object from the associated base structure connected to the each portion of the object.

12. A method for forming aircraft parts, the method comprising:
  placing layers of precursor material on a base structure for a frame in which the layers of precursor material are selected from one of a powder, a liquid, a metal powder, a ceramic powder, and a plastic powder;
  selectively curing the layers of precursor material using a curing system selected from one of a heating system, a laser, and an electron beam after placing the layers of precursor material on the base structure to form a portion of an aircraft part and a portion of the frame to form a prior layer of precursor material;
  moving the frame to allow a new layer of precursor material to be placed on the prior layer of precursor material in the layers of precursor material that have been selectively cured, wherein the moving of the frame is performed by a movement system which holds and moves the frame along an axis;
  placing the new layer of precursor material on the prior layer of precursor material;
  determining whether a new base structure in the frame is needed;
  responsive to a determination that the new base structure is needed, selectively curing the new layer of precursor material to form an additional portion of the aircraft part and a portion of the new base structure;
  responsive to the determination that the new base structure is needed, repeating the steps of moving the frame to allow the new layer of precursor material to be placed on the prior layer of precursor material in the layers of precursor material that have been selectively cured; placing the new layer of precursor material on the prior layer of precursor material; and selectively curing the new layer of precursor material to form a portion of the aircraft part and the portion of the new base structure until the base structure is completed;
  responsive to an absence of the determination that the new base structure is needed, selectively curing the new layer of precursor material to form the additional portion of the aircraft part without forming the new base structure;
  responsive to the absence of the determination that the new base structure is needed, repeating the steps of moving the frame to allow the new layer of precursor material to be placed on the prior layer of precursor material in the layers of precursor material that have been selectively cured; placing the new layer of precursor material on the prior layer of precursor material; and selectively curing the new layer of precursor material to form the portion of the aircraft part without the new base structure until the new base structure is needed;

maintaining a desired temperature for the aircraft part as the aircraft part is formed in different locations in a chamber using a plurality of heating and cooling elements;

cooling uncured precursor material to change a density of the uncured precursor material such that a flow of gas through the precursor material is reduced; and separating each portion of the aircraft part from an associated base structure connected to the each portion of the aircraft part using a separation system, wherein the separations system comprises cutters.

* * * * *